United States Patent

Shimura et al.

[11] Patent Number: 5,989,440
[45] Date of Patent: *Nov. 23, 1999

[54] METHOD OF USING OXYGEN SCAVENGER AND REMOVING OXYGEN FROM WATER

[75] Inventors: Yukimasa Shimura; Shiro Taya, both of Tokyo, Japan

[73] Assignee: Kurita Water Industries Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/975,000

[22] Filed: Nov. 20, 1997

[30] Foreign Application Priority Data

| | | | |
|---|---|---|---|
| Nov. 28, 1996 | [JP] | Japan | H8-318140 |
| Mar. 17, 1997 | [JP] | Japan | H9-063579 |
| May 28, 1997 | [JP] | Japan | H9-138468 |
| Oct. 21, 1997 | [JP] | Japan | H9-288490 |

[51] Int. Cl.$^6$ .................................................. C02F 1/70
[52] U.S. Cl. ................ 210/750; 210/757; 252/188.28; 252/394; 422/16; 422/17; 548/557
[58] Field of Search ................. 548/557; 210/750, 210/757; 252/188.28, 394, 405; 422/16, 17

[56] References Cited

U.S. PATENT DOCUMENTS

| | | | |
|---|---|---|---|
| 4,051,147 | 9/1977 | Johnson | 548/557 |
| 4,096,085 | 6/1978 | Holoman, Jr. et al. | 252/189 |
| 4,389,327 | 6/1983 | Rothgery et al. | 252/188.28 |
| 5,141,716 | 8/1992 | Muccitelli et al. | 422/16 |
| 5,167,835 | 12/1992 | Harder et al. | 210/750 |
| 5,169,598 | 12/1992 | Zellmeisl et al. | 422/16 |
| 5,178,286 | 1/1993 | Jahnke et al. | 252/77 |
| 5,258,125 | 11/1993 | Kelley et al. | 210/750 |
| 5,294,400 | 3/1994 | Peterson et al. | 422/16 |
| 5,322,640 | 6/1994 | Byrne et al. | 252/392 |
| 5,328,635 | 7/1994 | Chou et al. | 252/194 |
| 5,744,069 | 4/1998 | Maeda et al. | 252/394 |

FOREIGN PATENT DOCUMENTS

0 567 275  10/1993  European Pat. Off. .

*Primary Examiner*—Peter A. Hruskoci
*Attorney, Agent, or Firm*—Kanesaka & Takeuchi

[57] ABSTRACT

An oxygen scavenger characterized in that the effective component thereof consists of a heterocyclic compound with N—N bond in a ring thereof An oxygen scavenger characterized in that the effective component thereof consists of a heterocyclic compound with N-substituted amino group. An oxygen scavenger characterized in that the effective component thereof consists of a heterocyclic compound represented by the following formula:

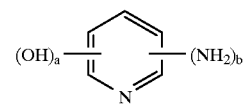

(wherein a, b are integers between 0 and 5 to satisfy a relation "$2 \leq a+b \leq 5$").

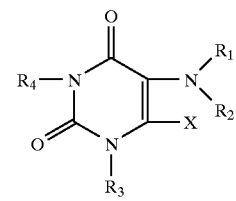

An oxygen scavenger characterized in that the effective component thereof consists of azodicarbonamide. An oxygen scavenger characterized by including a heterocyclic compound with N-substituted amino group, or the salt thereof, and a hydroxybenzene derivative. Those may contain further neutral amine, alkalic agent and/or water soluble polymer.

8 Claims, 2 Drawing Sheets

METHOD OF USING OXYGEN SCAVENGER AND REMOVING OXYGEN FROM WATER

FIELD OF THE INVENTION AND RELATED ART

The present invention relates to an oxygen scavenger, and more particularly to an oxygen scavenger which can effectively remove dissolved oxygen in water and, in particular, is useful in inhibiting the corrosion in a boiler system by removing dissolved oxygen in feed water. In addition, the present invention relates to boiler water treatment chemical including such an oxygen scavenger and descaling chemicals.

Dissolved oxygen in feed water contributes corrosion in components of a boiler system such as a boiler main body, a heat exchanger and an economizer arranged in an upstream of the boiler main body, and a steam and condensate piping arranged in a downstream of the boiler main body. To inhibit the corrosion in the boiler system, dissolved oxygen in feed water should be removed by deoxidizing treatment of the feed water of the boiler.

Conventionally, chemical treatment or physical treatment has been applied for the removal of dissolved oxygen. As for the chemical treatment, a method of adding an oxygen scavenger such as hydrazine ($N_2H_4$), sodium sulfite ($Na_2SO_3$), hydroxylamine group, or saccharide into the boiler water has been widely employed. Proposed in JPB S59-42073 and JPA H6-23394 is an agent containing hydroxylamine group and neutral amine.

However, the safety for humans of hydrazine is doubtful and thus the handling of hydrazine is at stake.

Since the reaction between sodium sulfite and oxygen is too rapid, sodium sulfite dissolved in water and stored in a tank reacts with oxygen in air before it is added in feed water, thereby reducing the concentration of effective component thereof Therefore, there is a problem that sodium sulfite sometimes does not produce sufficient effect of dissolved oxygen removal. Since the feed water treated with sodium sulfite contains sulphate ion as a reaction product of the sodium sulfite and oxygen, there is another problem that the corrosion and scale in a boiler system are easily caused.

There is also a problem that hydroxylamine group generates acid such as nitric acid when the hydroxylamine group is added in feed water and reacts with oxygen in the boiler, thereby reducing corrosion inhibition effect for the boiler main body.

Saccharide has disadvantages in that it is difficult to measure the residual concentration in boiler water and thus difficult to control the right amount to be added, and saccharide gives odor to the steam.

Using azo compound as an oxygen scavenger has been already proposed. For example, 2,2-azobis (N,N'-dimethlene isobuthy amidine) 2,2-azobis (isobuthyl amide)-2 hydrate, 4,4-azobis (4-cyano caproic acid), and 2,2-azobis (2-amidino propane)-HCI have been proposed.

Each of these azo compounds provides high efficiency of dissolved oxygen removal. However, azo compounds have disadvantages in producing various organic matters such as formic acid and acetic acid in a boiler drum and the steam and thereby adversely affecting the steam quality and the steam purity.

OBJECT AND SUMMARY OF THE INVENTION

It is the first object of the present invention to provide a novel oxygen scavenger which can efficiently remove dissolve oxygen in boiler feed water while providing high safety for humans.

It is the second object of the present invention to provide an oxygen scavenger having a heterocyclic compound with N-substituted amino group as an effective component which can adequately exhibit the deoxidization effect not only for feed water lines, a boiler main body, or steam and condensate lines for high temperature water, but also for feed water lines for low temperature water.

It is the third object of the present invention to provide a novel chemical for treating boiler water which can exhibit corrosion inhibition effect to both a boiler main body and a piping for the steam and condensate.

It is the fourth object of the present invention to provide a boiler water treatment chemical which has high corrosion inhibition effect by a heterocyclic compound with N-substituted amino group and exhibit excellent corrosion inhibition effect and scale inhibition effect as a state of a solution which contains component agents.

In an oxygen scavenger of a first aspect, the effective component thereof consists essentially of a heterocyclic compound having N—N bond in a ring thereof.

In an oxygen scavenger of a second aspect, the effective component thereof consists of a heterocyclic compound having N-substituted amino group or its water soluble salt.

In an oxygen scavenger of a third aspect, the effective component thereof consists of the following heterocyclic compound:

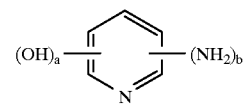

(wherein a, b are integers between 0 and 5 to satisfy a relation "$2 \leq a+b \leq 5$").

In an oxygen scavenger of a fourth aspect, the effective component thereof consists essentially of a heterocyclic compound represented by the following formula:

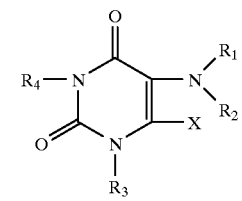

(wherein $R_1$, $R_2$, $R_3$, $R_4$ may be the same or different from each other and each designates any one of hydrogen, lower alkyl group having 1–8 carbon atoms, and aryl group also having 1–8 carbon atoms, and X designates any one of hydrogen, amino group, alkyl group or dialkylamino group having 1–8 carbon atoms, and lower alkyl group or aryl group having 1–8 carbon atoms).

In an oxygen scavenger of a fifth aspect, the effective component thereof consists essentially of azodicarbonamide.

The oxygen scavengers of the first through fifth aspect may be prepared by combining two or more kinds of components.

The amount of the effective component of each aspect is not limited and can be altered to suitably correspond to the concentration of dissolved oxygen in water as a subject.

Normally, the amount is, however, between 0.001 and 1000 mg, preferably between 1 and 300 mg relative to 1 lit. of feed water.

An oxygen scavenger of a sixth aspect includes a heterocyclic compound with N-substituted amino group, or the salt thereof and a hydroxybenzene derivative.

In the oxygen scavenger of the sixth aspect, because of the catalysis of the hydroxybenzene derivative, the heterocyclic compound with N-substituted amino group or the salt thereof can exhibit the excellent deoxidization effect even in feed water lines for low temperature water.

A seventh aspect provides a chemical for treating boiler water including a heterocyclic compound with N-substituted amino group and neutral amine.

An eigth aspect provides a boiler water treatment chemical including a heterocyclic compound with N-substituted amino group, or the salt thereof, and alkaline agent and/or water soluble polymer.

PREFERRED EMBODIMENTS

1. First Aspect

Figure 1:
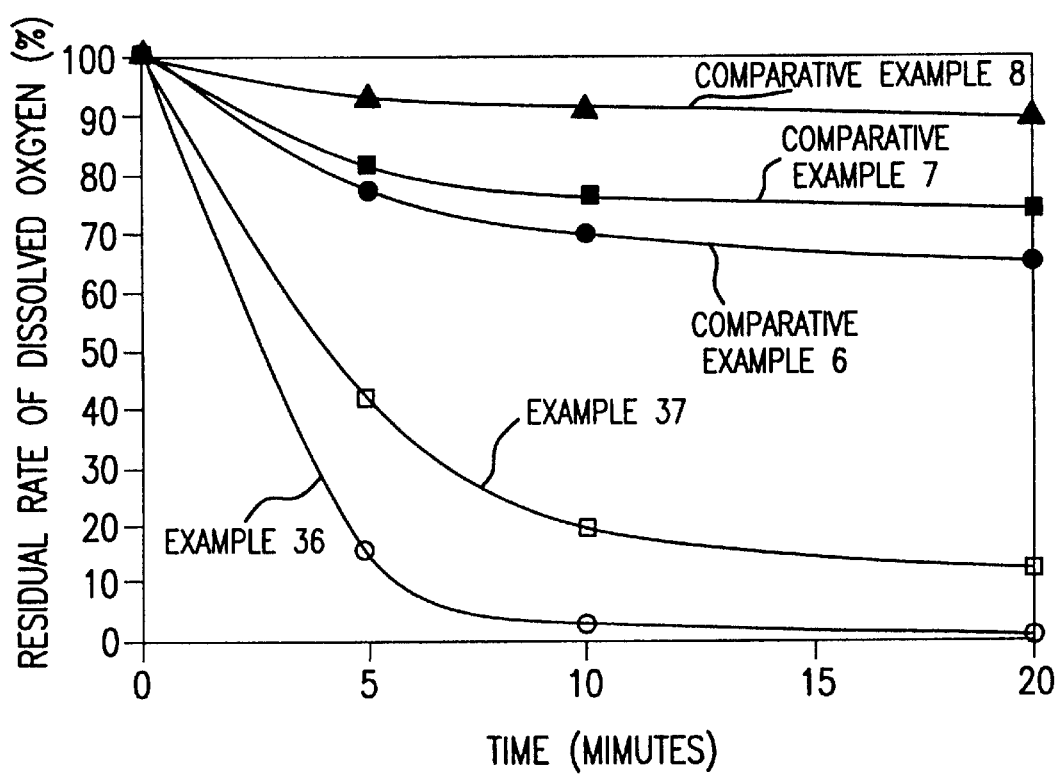
FIG. 1 is a graph showing results of examples 36, 37 and comparative examples 6 through 8.

In an oxygen scavenger of a first aspect, the effective component thereof consists of a heterocyclic compound having N—N bond in a ring thereof. Included as such a heterocyclic compound is preferably at least of one of the followings:

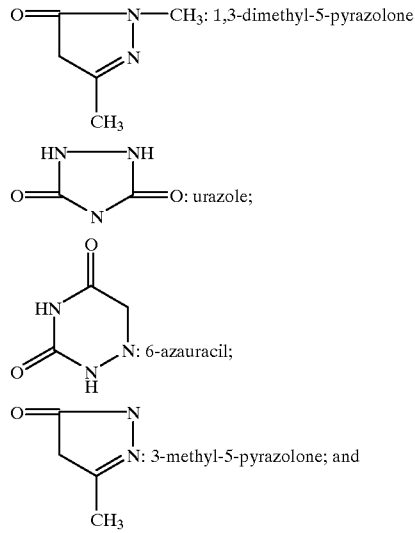

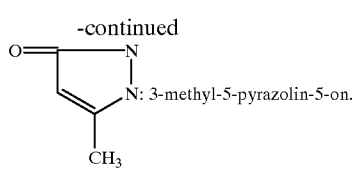

The above heterocyclic compounds may be used alone or in combination.

EXAMPLES 1 THROUGH 10

Effect of the oxygen scavenger of the first aspect has been tested as follow.

Softened water saturated with oxygen in air at the room temperature was fed into a steam generator test autoclave and the autoclave was operated to generate steam under the following conditions:

Temperature: 185° C., Pressure: 1 MPa, Amount of Evaporation: 12 liters/hr, and Blow Rate: 10%.

The generated steam was completely condensed to produce condensed water. Then, the dissolved oxygen concentration in the condensed water was measured by a dissolved oxygen meter. Thus obtained value was used as data of a comparative example 1.

On the other hand, steam was generated under the same conditions except that the oxygen scavenger was added in the feed water. Then, the dissolved oxygen concentration in the condensed water of the steam was also measured. The difference between thus obtained value and the data of the comparative example 1 was calculated as an amount of extraction and the ratio of the extraction to the data of the comparative example was calculated as an extraction ratio (%).

As for each example 1 through 10, the heterocyclic compound shown in Table 1 was dissolved in the aforementioned softened water to prepare aqueous solution with a predetermined concentration, then the aqueous solution was fed into the feed water by a fixed displacement pump, and the concentration of the heterocyclic compound to the feed water was controlled to be as shown in Table 1.

The results are shown in Table 1.

TABLE 1

| | Heterocyclic compound | | Concentration of dissolved oxygen | | |
|---|---|---|---|---|---|
| | Kind | Concentration in feed water (mg/L) | in flocculated water (mg/L) | Amount of removal (mg/L) | Rate of removal (%) |
| Example 1 | 1,3-dimethyl-5-pyrazolone | 45 | 2.00 | 6.25 | 75.8 |
| Example 2 | 1,3-dimethyl-5-pyrazolone | 80 | 0.50 | 7.75 | 93.9 |
| Example 3 | urazol | 20 | 3.60 | 4.65 | 50.4 |

TABLE 1-continued

| | Heterocyclic compound | | Concentration of dissolved oxygen | | | |
|---|---|---|---|---|---|---|
| | Kind | Concentration in feed water (mg/L) | in flocculated water (mg/L) | Amount of removal (mg/L) | Rate of removal (%) |
| Example 4 | urazol | 40 | 0.50 | 7.75 | 93.9 |
| Example 5 | 6-azauracil | 45 | 2.35 | 5.90 | 71.5 |
| Example 6 | 6-azauracil | 90 | 0.40 | 7.85 | 95.2 |
| Example 7 | 3-methyl-5-pyrazolone | 40 | 1.75 | 6.50 | 78.8 |
| Example 8 | 3-methyl-5-pyrazolone | 80 | 0.35 | 7.90 | 95.8 |
| Example 9 | 3-methyl-5-pyrazoline-5-on | 40 | 1.75 | 6.50 | 78.8 |
| Example 10 | 3-methyl-5-pyrazoline-5-on | 80 | 0.40 | 7.85 | 95.2 |
| Comparative Example 1 | None | 0 | 8.25 | — | — |

2. Second Aspect

In an oxygen scavenger of a second aspect, the effective component thereof consists of a heterocyclic compound having N-substituted amino group or water soluble salt thereof Included as such a heterocyclic compound is preferably at least one of the followings:

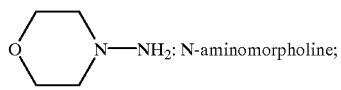
N-aminomorpholine;

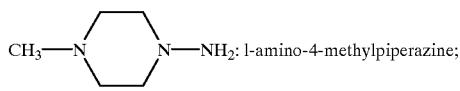
1-amino-4-methylpiperazine;

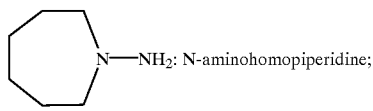
N-aminohomopiperidine;

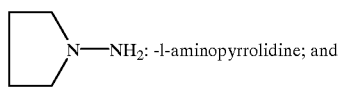
-1-aminopyrrolidine; and

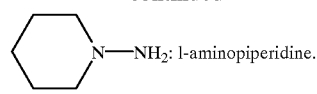
1-aminopiperidine.

As the salt thereof for example, water soluble salt of the aforementioned heterocyclic compounds and aliphatic carboxylic acid such as succinic acid, glutaric acid, adipic acid, gluconic acid, glycollic acid, lactic acid, malic acid, tartaric acid, or citric acid, or polycarboxylic acid such as polyacrylic acid is preferably employed, but the salt thereof is not limited thereto.

The above heterocyclic compounds or the salts thereof may be used alone or in combination.

EXAMPLES 1 THROUGH 21

The deoxidizing treatment was made in each example in the same manner as the above examples 1 through 10 except using the heterocyclic compound shown in Table 2 as the effective component of the oxygen scavenger to have the concentration of the heterocyclic compound in the feed water as shown in Table 2. The results are shown in Table 2.

TABLE 2

| | Heterocyclic compound | | Concentration of dissolved oxygen | | | |
|---|---|---|---|---|---|---|
| | Kind | Concentration in feed water (mg/L) | in flocculated water (mg/L) | Amount of removal (mg/L) | Rate of removal (%) |
| Example 11 | N-aminomorpholine | 25 | 1.60 | 6.65 | 80.1 |
| Example 12 | N-aminomorpholine | 50 | 0.45 | 7.80 | 94.5 |
| Example 13 | N-aminomorpholine | 85 | 0.35 | 7.90 | 95.8 |
| Example 14 | 1-amino-4-methylpiperazine | 40 | 1.10 | 7.15 | 86.7 |
| Example 15 | 1-amino-4-methylpiperazine | 80 | 0.40 | 7.85 | 95.2 |
| Example 16 | N-aminohomopiperidine | 40 | 1.20 | 7.05 | 85.5 |
| Example 17 | N-aminohomopiperidine | 80 | 0.45 | 7.80 | 94.5 |
| Example 18 | 1-aminopyrrolidine | 40 | 0.95 | 7.35 | 89.1 |
| Example 19 | 1-aminopyrrolidine | 80 | 0.45 | 7.80 | 94.5 |
| Example 20 | 1-aminopyrrolidine | 40 | 0.95 | 7.30 | 88.5 |
| Example 21 | 1-aminopyrrolidine | 80 | 0.40 | 7.85 | 95.2 |
| Comparative Example 1 | None | 0 | 8.25 | — | — |

3. Third Aspect

In an oxygen scavenger of a third aspect, the effective component thereof consists of the following heterocyclic compound:

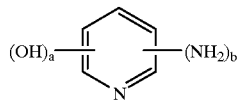

Included as such a heterocyclic compound are preferably at least one of the follwings:

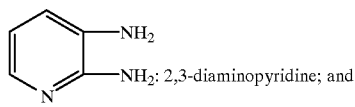
NH₂: 2,3-diaminopyridine; and

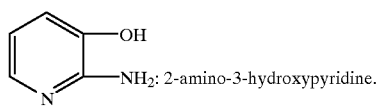
NH₂: 2-amino-3-hydroxypyridine.

The above heterocyclic compounds may be used alone or in combination.

EXAMPLES 22 THROUGH 27

The deoxidizing treatment was made in each example in the same manner as the above examples 1 through 10 except using the heterocyclic compound shown in Table 3 as the effective component of the oxygen scavenger to have the concentration of the heterocyclic compound as shown in Table 3. The results are shown in Table 3.

4. Fourth Aspect

In an oxygen scavenger of a fourth aspect, is characterized in that the effective component thereof consists of a heterocyclic compound represented by the following formula:

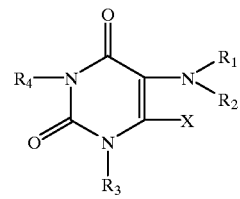

In this effective component of the oxygen scavenger of the fourth aspect, for example, methyl group is preferably used as lower alkyl group having 1–8 carbon atoms designated with $R_1$, $R_2$, $R_3$, $R_4$ and phenyl group or tolyl group is preferably used as aryl group also having 1–8 carbon atoms. In addition, methyl group or aminomethyl group is preferably used as alkyl group or dialkylamino group having 1–8 carbon atoms designated with X.

Included as such a heterocyclic compound is preferably at least one of the followings:

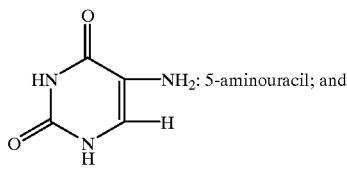
NH₂: 5-aminouracil; and ($R_1$, $R_2$, $R_3$, $R_4$ and X are all hydrogen)

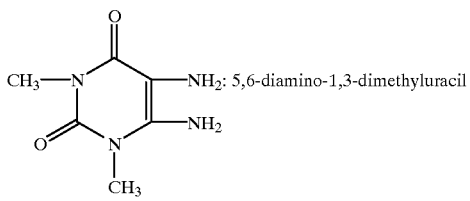
NH₂: 5,6-diamino-1,3-dimethyluracil ($R_1$, $R_2$ are hydrogen, $R_3$, $R_4$ are methyl group, X is amino group).

The above heterocyclic compounds may be used alone or in combination.

TABLE 3

| | Heterocyclic compound | | Concentration of dissolved oxygen | | |
|---|---|---|---|---|---|
| | Kind | Concentration in feed water (mg/L) | in flocculated water (mg/L) | Amount of removal (mg/L) | Rate of removal (%) |
| Example 22 | 2,3-diaminopyridine | 250 | 3.60 | 4.65 | 56.4 |
| Example 23 | 2,3-diaminopyridine | 400 | 2.15 | 6.10 | 73.9 |
| Example 24 | 2-amino-3-hydroxypyridine | 40 | 2.35 | 5.90 | 71.5 |
| Example 25 | 2-amino-3-hydroxypyridine | 55 | 0.75 | 7.50 | 90.9 |
| Example 26 | 2-amino-3-hydroxypyridine | 65 | 0.50 | 7.75 | 93.9 |
| Example 27 | 2-amino-3-hydroxypyridine | 140 | 0.10 | 8.15 | 98.8 |
| Comparative Example 1 | None | 0 | 8.25 | — | — |

EXAMPLES 28 THROUGH 34

The deoxidizing treatment was made in each example in the same manner as the above examples 1 through 10 except using the heterocyclic compound shown in Table 4 as the effective component of the oxygen scavenger to have the concentration of the heterocyclic compound in the feed water as shown in Table 4. The results are shown in Table 4.

TABLE 4

| | Heterocyclic compound | | Concentration of dissolved oxygen | | |
|---|---|---|---|---|---|
| | Kind | Concentration in feed water (mg/L) | in flocculated water (mg/L) | Amount of removal (mg/L) | Rate of removal (%) |
| Example 28 | 5-aminouracil | 30 | 3.00 | 5.25 | 63.6 |
| Example 29 | 5-aminouracil | 50 | 1.30 | 6.95 | 84.2 |
| Example 30 | 5-aminouracil | 90 | 1.10 | 7.15 | 86.7 |
| Example 31 | 5,6-diamino-1,3-dimethyluracil | 35 | 2.00 | 5.25 | 63.6 |
| Example 32 | 5,6-diamino-1,3-dimethyluracil | 50 | 0.95 | 7.30 | 88.5 |
| Example 33 | 5,6-diamino-1,3-dimethyluracil | 70 | 0.45 | 7.80 | 94.5 |
| Example 34 | 5,6-diamino-1,3-dimethyluracil | 100 | 0.35 | 7.90 | 95.8 |
| Comparative Example 1 | None | 0 | 8.25 | — | — |

5. Fifth Aspect

In an oxygen scavenger of a fifth aspect is characterized in that the effective component thereof is azodicarbonamide ($NH_2CON=NCONH_2$).

Azodicarbonamide has an advantage in maintaining the purity of generated steam without changing water quality in the boiler because the azodicarbonamide does not produce any organic matter such as formic acid or acetic acid.

EXAMPLE 35, COMPARATIVE EXAMPLES 2 THROUGH 5

The deoxidizing treatment was made in this example and each comparative example in the same manner as the above examples 1 through 10 except adding the azo compound shown in Table 5 as the effective component of the oxygen scavenger to have the concentration of 150 mg/L in the feed water. The results are shown in Table 5.

Main products in the generated steam and main products in the autoclave are analyzed, respectively. The results are also shown in Table 5.

In the oxygen scavenger of the sixth aspect, because of the catalysis of the hydroxybenzene derivative, the heterocyclic compound with N-substituted amino group or the salt thereof can exhibit the excellent deoxidization effect even in feed water lines for low temperature water.

The heterocyclic compound with N-substituted amino group is preferably at least one of 1-aminopyrrolidine, 1-amino-4-methlpiperazine, 1-aminopiperidine, 1-aminohomopiperidine, 1,4-diaminopiperazine, N-aminomorholine, and morholinobyguanide. As the salt thereof, for example, water soluble salt of the aforementioned heterocyclic compounds and carboxylic acid such as succinic acid, gluconic acid, glutaric acid, adipic acid, glycollic acid, lactic acid, malic acid, tartaric acid or citric acid or polycarboxylic acid such as polyacrylic acid is preferably employed, but the salt thereof is not limited thereto. These heterocyclic compounds and the salts thereof may be suitably used alone or in combination.

As the hydroxybenzene derivative, hydroquinone, 2,3-dimethyl-1,4-hydroquinone, catechole, 4-tert-buthyl catechol, pyrogallol, 1,2,4-hydroxybenzene, gallic acid, 2-aminophenol, 2,4 diaminophenol, 4-aminophenol may be

TABLE 5

| | Azo compound | Concentration of dissolved oxygen in flocculated water (mg/L) | Amount of removal (mg/L) | Rate of removal (%) | Main product in steam | Main product in autoclave |
|---|---|---|---|---|---|---|
| Example 35 | azodicarbonamide | 0.35 | 7.90 | 95.8 | carbon dioxide, ammonia | — |
| Comparative Example 1 | No added | 8.25 | — | — | — | — |
| Comparative Example 2 | 2,2-azobis(N,N'-dimethyleneisobuthylamidine) | 1.05 | 7.20 | 87.3 | acetone, methylamine, isopropyl alcohol | formic acid, acetic acid, isopropyl alcohol |
| Comparative Example 3 | 2,2-azobis(isobuthylamide).2hydrate | 0.25 | 8.00 | 97.0 | acetone, carbon dioxide, isopropyl alcohol, ammonia | formic acid, acetic acid, isopropyl alcohol |
| Comparative Example 4 | 4,4-azobis(4-cyanocaproic acid) | 0.35 | 7.90 | 95.8 | carbon dioxide | various organic acid |
| Comparative Example 5 | 2,2-azobis(2-amidino propane)HCl | 0.45 | 7.85 | 95.2 | acetone, isopropyl alcohol, ammonia | formic acid, isopropyl alcohol |

As apparent from Table 5, all of the azo compounds provide high rates of dissolved oxygen removal. In particular, azodicarbonamide generates no organic acid changing the water quality of the feed water in the autoclave which corresponds to a boiler drum so that azodicarbonamide is preferably used as oxygen scavenger for feed water of the boiler.

6. Sixth Aspect

An oxygen scavenger of a sixth aspect includes a heterocyclic compound with N-substituted amino group, or the salt thereof and a hydroxybenzene derivative.

employed, but the hydroxybenzene derivative is not limited to these. The hydroxybenzene derivative may also be suitably used alone or in combination.

Though the oxygen scavenger of the sixth aspect can be prepared by mixing the heterocyclic compound with N-substituted amino group or the salt thereof and the hydroxybenzene derivative, these may be separately injected.

The amount of the oxygen scavenger of the sixth aspect can be altered to suitably correspond to the concentration of dissolved oxygen and other water conditions in feed water of a boiler system as a subject. Normally, the heterocyclic compound with N-substituted amino group or the salt thereof and the hydroxybenzene derivative are, however, each added by between 0.001 and 1000 mg, preferably between 0.01 and 300 mg, more preferably between 0.02 and 100 mg relative to 1 lit. of feed water.

The effect ratio of the heterocyclic compound with N-substituted amino group or the salt thereof and the hydroxybenzene derivative in the oxygen scavenger of the sixth aspect is heterocyclic compound with N-substituted amino group or salt thereof: hydroxybenzene derivative= 1:0.001–10 (ratio in weight). When the hydroxybenzene derivative is less than the ratio, the effect improved by using the hydroxybenzene derivative according to the present invention, i.e. the improved effect of the deoxidization to low temperature water can not be sufficiently provided. On the other hand, when the hydroxybenzene derivative is more than the ratio, the treatment cost becomes higher relative to the increase in the effect.

The oxygen scavenger of the sixth aspect is dissolved in water in such a manner that the acescent hydroxybenzene derivative is neutralized by the heterocyclic compound having basic N-substituted amino group. When it is difficult to dissolve the oxygen scavenger, adding alkali such as caustic soda (NaOH) improves the solubility of the oxygen scavenger.

Though the oxygen scavenger of the sixth aspect includes the heterocyclic compound with N-substituted amino group or the salt thereof and the hydroxybenzene derivative if necessary, another oxygen scavenger or corrosion inhibitor such as hydrazine, sodium sulfite, succinic acid or gluconic acid or furthermore dispersant, chelate compound, descaling chemicals, or the mixture of some among these may also be added.

The oxygen scavenger of the sixth aspect can be effectively used in boiler systems of various types such as low pressure, medium pressure, and high pressure boiler systems and is not restricted at all by the boiler pressure, the boiler type, or the kind of feed water.

EXAMPLES 36, 37, COMPARATIVE EXAMPLES 6 THROUGH 8

After filling 1 lit. of softened water of Atsugi-city's tap water into an Erlenmeyer flask and controlling pH to be 9.0 by using NaOH, it was agitated two hours in a constant-temperature water bath at 60° C. in such a manner as to be saturated by oxygen in air. The concentration of dissolved oxygen at this point was measured by a dissolved oxygen meter ("MOCA3600" manufactured by Obisfair Co., Ltd.) with the result that it was 4.75 mg/L.

After adding chemicals by the respective amounts shown in Table 6 into the water in the Erlenmeyer flask and sufficiently agitating them, the resultant solution was poured into three furan bottles of 200 ml capacity and the furan bottles were capped without space therein and then returned into the constant-temperature water bath at 60° C. to cause the reaction of the solution. The furan bottles were taken out from the constant-temperature water bath one at a time with the passage of predetermined periods (5, 10, 20 minutes) and the concentrations of dissolved oxygen in the solution were measured by the dissolved oxygen meter. The residual rate of dissolved oxygen in each sample solution was calculated from the ratio of the concentration of dissolved oxygen after adding the chemicals to that before adding the chemicals. These operations were rapidly performed in nitrogen-atmosphere.

The results are shown in Table 6 and FIG. 1.

As apparent from the results, it is found that the deoxidization reaction is significantly speeded up by using hydroquinone (HQ) as a hydroxybenzene derivative with 1-aminopyrrolidine (APY) or 1-amino-4methylpiperazine (AMPI) as a heterocyclic compound with N-substituted amino group.

TABLE 6

| Agent added and its concentration (mg/L) | | | Concentration of dissolved oxygen after addition of agent (mg/L) | | | |
| --- | --- | --- | --- | --- | --- | --- |
| Ex. | APY | AMP I | HQ | Just after addition | 5 min. later | 10 min. later | 20 min. later |
| Ex. 36 | 100 | — | 2 | 4.75 | 0.78 | 0.18 | 0.08 |
| 37 | — | 100 | 2 | 4.75 | 2.01 | 0.96 | 0.58 |
| Co. 6 | 100 | — | — | 4.75 | 3.69 | 3.33 | 3.12 |
| 7 | — | 100 | — | 4.75 | 3.86 | 3.63 | 3.52 |
| 8 | — | — | 2 | 4.75 | 4.43 | 4.33 | 4.31 |

(Notes)
Ex.: Example
Co.: Comparative Example
APY: 1-aminopyrrolidine
AMPI: 1-amino-4-methylpiperazine
HQ: Hydroquinone

7. Seventh Aspect

A seventh aspect provides a chemical for treating boiler water including a heterocyclic compound with N-substituted amino group and neutral amine.

The essential components of the chemical of this aspect are the heterocyclic compound with N-substituted amino group and the neutral amine.

The heterocyclic compound with N-substituted amino group exhibits the excellent deoxidization effect by reacting with dissolved oxygen in boiler water so as to inhibit the corrosion in a boiler main body.

The chemical has the following useful functions in addition to the aforementioned functions of the heterocyclic compound with N-substituted amino group.

The heterocyclic compound with N-substituted amino group has volatility characteristics and excellent reduction ability relative to iron. In other words, the heterocyclic compound has functions of inhibiting the oxidation of iron, that is, inhibiting the corrosion of iron.

Therefore, steam condensate generated from boiler water treated with the chemical of the seventh aspect is deprived of the characteristics of corroding a piping through which the steam condensate passes because of the aforementioned functions of the heterocyclic compound which is included in the steam condensate. In addition, the steam condensate is held in a pH range of neutral or alkaline because of the functions of the neutral amine which is also included in the condensate, thereby inhibiting the corrosion of the piping through which the condensate passes.

That is, the chemicals of this aspect can exhibit the corrosion inhibition effect in both the boiler main body and the steam and condensate piping.

Any compound which can exhibit the functions and effects as mentioned above may be employed as the heterocyclic compound with N-substituted amino group. For example, N-aminomorpholine, 1-aminopyrrolidine, 1-amino-4methylpiperazine, 1,4-diaminopiperazine, 1-aminopiperidine, 1-aminohomopiperidine, morpholinobiguamide may be preferably employed and water soluble salt of the aforementioned heterocyclic compounds and carboxylic acid such as succinic acid, gluconic acid, glutaric acid, adipic acid, glycollic acid, lactic acid, malic acid, tartaric acid or citric acid, polycarboxylic acid such as polyacrylic acid are also preferably employed. Moreover, these heterocyclic compounds and the salts thereof may be suitably used alone or in combination.

Any compound capable of making the boiler water after treatment and the steam condensate neutral or alkaline may be employed as the neutral amine, the other essential component of the chemical. For example, cyclohexylamine, 2-amino-2-methyl-1-propanol, monoethanolamine, diethanolamine, morpholine, monoisopropanolamine, diethylethanolamine, dimethylpropanolamine, dimethylethanolamine, and dimelthylpropylamine may be preferably employed. These may be suitably used alone or in combination.

The chemical of the seventh aspect is prepared by mixing the heterocyclic compounds and the neutral amine as mentioned above.

The mixing ratio thereof can be determined to suitably correspond to the concentration of dissolved oxygen and other water conditions in feed water of a boiler system as a subject. However, the heterocyclic compounds and the neutral amine are normally each added by between 0.001 and 1000 mg, preferably between 0.01 and 300 mg, more preferably between 0.02 and 100 mg relative to 1 lit. of feed water.

Though the essential components of the chemical of the seventh aspect are the heterocyclic compound with N-substituted amino group and the neutral amine, another known oxygen scavenger or corrosion inhibitor such as hydrazine, sodium sulfite, succinic acid or gluconic acid or furthermore the known dispersant, chelate compound, descaling chemicals, or the mixture of some among these may also be added.

The chemical of the seventh aspect can be effectively used in boiler systems of various types such as low pressure, medium pressure, and high pressure boiler systems and is not restricted at all by the boiler pressure or the type of feed water.

EXAMPLES 38 THROUGH 44, COMPARATIVE EXAMPLES 9 THROUGH 20

After feeding softened water of Atsugi-city's tap water which has been saturated by oxygen in air at 40° C. into an experimental electric boiler with a capacity of 5 liters and the boiler was operated to generate steam under the following conditions:

Temperature: 183° C., Pressure: 1 MPa, Amount of Evaporation: 12 liters/hr, and Blow Rate: 10%.

The steam was cooled to produce condensate. The condensate was cooled to 50° C. and then fed into a column. Previously disposed in the column and the aforementioned experimental electric boiler were test pieces made of steel (SS400 of Japanese Industrial Standard) each having a length of 50 mm, a width of 15 mm, and a thickness of 1 mm. The test pieces were dipped in said condensate 96 hours.

The amounts of corrosion of the respective pieces were measured to calculate the corrosion rates in the boiler water and the condensate. The resultant values were indexes representing the degree of corrosion of the pieces caused by the boiler water without chemical treatment. The results are shown in Table 8 as a comparative example 9.

It should be noted that the concentration of nitrate ion and the concentration of nitrite ion in the boiler water after the operation were measured and the results are also shown in Table 8.

The chemical components shown in Table 7 were dissolved in softened water mentioned above in such a manner as to have the respective indicated concentrations in the softened water and then supplied to the boiler by using a fixed displacement pump.

TABLE 7

| | Concentration of each component (mg/L) | | | | | | | |
|---|---|---|---|---|---|---|---|---|
| | Hydroxylamine group | | Heterocyclic compound | | | Neutral amine | | |
| | diethylhyd-roxylamine | isoproxylhyd-roxylamine | N-amino-morpholine | 1-amino-pyrrolidine | 1-amino-4-methyl-piperazine | cyclohexyl-amine | 2-amino-2-methyl-1-propanol | monoethanol-amine |
| Comparative Example 10 | 36 | — | — | — | — | — | — | — |
| Comparative Example 11 | — | 36 | — | — | — | — | — | — |
| Comparative Example 12 | 36 | — | — | — | — | 30 | — | — |
| Comparative Example 13 | 36 | — | — | — | — | — | 30 | — |
| Comparative Example 14 | 36 | — | — | — | — | — | — | 30 |
| Comparative Example 15 | — | 36 | — | — | — | 30 | — | — |
| Comparative Example 16 | — | 36 | — | — | — | — | 30 | — |
| Comparative Example 17 | 18 | 18 | — | — | — | 30 | — | — |
| Comparative Example 18 | — | — | 36 | — | — | — | — | — |
| Comparative Example 19 | — | — | — | 36 | — | — | — | — |
| Comparative Example 20 | — | — | — | — | 36 | — | — | — |
| Example 38 | — | — | 36 | — | — | 30 | — | — |
| Example 39 | — | — | 36 | — | — | — | 30 | — |
| Example 40 | — | — | 36 | — | — | — | — | 30 |
| Example 41 | — | — | — | 36 | — | 30 | — | — |
| Example 42 | — | — | — | 36 | — | — | 30 | — |
| Example 43 | — | — | — | — | 36 | 30 | — | — |
| Example 44 | — | — | — | — | 36 | — | 30 | — |

As for condensate of steam generated from the softened water in which the chemical components are dissolved, the corrosion test was made under the same conditions as that of the aforementioned comparative example 9 to calculate the corrosion rate of test coupons.

In addition, the concentration of nitrate ion and the concentration of nitrite ion in the boiler water after the operation were measured. The results are shown in Table 8.

TABLE 8

| | Corrosion rate of test piece (mdd) | | Concentration of nitric ion and nitrite ion in boiler water | |
|---|---|---|---|---|
| | In boiler water | In condensed water | nitric ion | nitrite ion |
| Comparative Example 9 | 10.5 | 143.5 | not detected | not detected |
| Comparative Example 10 | 2.0 | 48.3 | 2.3 | 3.1 |
| Comparative Example 11 | 2.3 | 39.4 | 3.5 | 4.2 |
| Comparative Example 12 | 2.0 | 29.2 | 2.8 | 3.6 |
| Comparative Example 13 | 1.8 | 34.6 | 2.7 | 2.9 |
| Comparative Example 14 | 1.7 | 33.3 | 1.9 | 3.3 |
| Comparative Example 15 | 2.4 | 26.4 | 4.3 | 4.1 |
| Comparative Example 16 | 2.6 | 28.6 | 5.2 | 4.5 |
| Comparative Example 17 | 2.1 | 24.3 | 3.4 | 3.8 |
| Comparative Example 18 | 1.0 | 30.3 | not detected | not detected |
| Comparative Example 19 | 1.2 | 23.5 | not detected | not detected |
| Comparative Example 20 | 0.9 | 21.6 | not detected | not detected |
| Example 38 | 0.8 | 8.4 | not detected | not detected |
| Example 39 | 1.0 | 9.3 | not detected | not detected |
| Example 40 | 0.7 | 9.1 | not detected | not detected |
| Example 41 | 1.1 | 9.5 | not detected | not detected |
| Example 42 | 0.9 | 9.8 | not detected | not detected |
| Example 43 | 0.8 | 11.3 | not detected | not detected |
| Example 44 | 1.0 | 12.5 | not detected | not detected |

As apparent from Table 7 and Table 8, the following facts are found.

1) The chemicals including hydroxyamine groups (comparative examples 10 through 17) are not convenient for inhibiting the corrosion of the boiler because nitrate ion and nitrite ion are produced in the boiler water.

2) Using the heterocyclic compound with N-substituted amino group alone reduces the corrosion rate of iron in the boiler water and does not produce nitrate ion and nitrite ion in the boiler water. Since, however, the corrosion rate of iron in the condensate is still large so that the corrosion in the steam and condensate piping will be caused, the heterocyclic compound is not convenient.

3) As compared to the above comparative examples, using any one of the chemicals of the examples does not produce nitrate ion and nitrite ion in the boiler water and significantly inhibits the corrosion of iron in both the boiler water and the condensate.

8. Eighth Aspect

A boiler water treatment chemical of an eighth aspect includes a heterocyclic compound with N-substituted amino group, or the salt thereof, and alkalic agent and/or water soluble polymer.

The heterocyclic compound with N-substituted amino group or the salt thereof has features of slower deoxidization reaction under the neutral condition and of higher deoxidization reaction under the alkaline condition in the case of low temperature water. Accordingly, using the alkalic agent improves the deoxidization effect of the heterocyclic compound even in the pipeline for low temperature water. As a result of this, the deoxidization effect in the feed water lines is further improved As a result of this, the deoxidization effect in the feed water lines is further improved and the amount of iron entered into the boiler is reduced. Iron entered from the feed water and iron eluted from the boiler drum adhere as iron oxide sludge to a heating surface. The iron oxide sludge causes an oxygen concentration cell or the like so as to contribute the corrosion. The increase in the corrosion inhibition effect in the feed water line can reduce such a secondary corrosion.

Using the water soluble polymer reduces the corrosion, caused by the iron oxide sludge, by its sludge dispersing function and, furthermore, can prevent the scaling on the heating surface even when the hardness components leak from a softener or ion exchange equipment.

Since pH of the steam condensate is held to be neutral or alkaline by using the neutral amine, the corrosion of the pipeline for the steam condensate (i.e. the steam drain line) is inhibited.

As the heterocyclic compound with N-substituted amino group used in the eighth aspect, 1-aminopyrrolidine, 1-amino-4-methlpiperazine, 1-aminopiperidine, 1-aminohomopiperidine, 1,4-diaminopiperazine, N-aminomorpholine, and morpholinobyguanide are preferably employed. As the salt thereof for example, water soluble salt of the aforementioned heterocyclic compounds and aliphatic carboxylic acid such as succinic acid, glutaric acid, adipic acid, gluconic acid, glycollic acid, lactic acid, malic acid, tartaric acid, or citric acid, or polycarboxylic acid such as polyacrylic acid is preferably employed, but the salt thereof is not limited thereto. These heterocyclic compounds and the salts thereof may be suitably used alone or in combination.

As the alkaline agent used in the eighth aspect, sodium hydroxide, potassium is not limited thereto. These alkaline agents may be suitably used alone or in combination.

As the water soluble polymer used in the eighth aspect, polyacrylic acid, polymaleic acid, polymethacrylate acid, copolymer of acrylic acid and acrylic amide, copolymer of acrylic acid and hydroxyallyloxypropanesulfonic acid, copolymer of acrylic acid and 2-acrylamide-2-methylpropanesulfonic acid, and the salt thereof are preferably employed, but it is not limited thereto. These water soluble polymers may be suitably used alone or in combination.

As the neutral amine used in the eighth aspect, any compound capable of making the boiler water and the steam condensate neutral or alkaline may be employed. For example, cyclohexylamine, 2-amino-2-methyl-1-propanol, monoethanolamine, diethanolamine, morpholine, monoisopropanolamine, dimethylethanolamine, diethylethanolamine, dimethylpropanolamine, and dimethylpropilamine may be preferably employed. These may be suitably used alone or in combination.

Though the boiler water treatment chemical of the eighth aspect can be prepared by mixing the aforementioned heterocyclic compound with N-substituted amino group or the salt thereof and the alkalic agent and/or water soluble polymer, and further by mixing the neutral amine if necessary, these may be separately injected.

The amount of the boiler water treatment chemical of the eigth aspect can be altered to suitably correspond to the concentration of dissolved oxygen and other water conditions in feed water of a boiler system as a subject. However, the heterocyclic compound with N-substituted amino group or the salt thereof and the alkalic agent and/or water soluble polymer are normally each added by between 0.001 and 1000 mg, preferably between 0.01 and 300 mg, more preferably between 0.02 and 100 mg relative to 1 lit. of feed water.

Particularly, the alkaline agent is preferably added in such a manner that pH becomes between 8 and 12, depending on the type of a boiler.

When the neutral amine is used with the boiler water treatment chemical, the preferable amount of the neutral amine is between 0.01 and 500 mg, particularly between 0.1 and 100 mg relative to 1 lit. of feed water.

In the boiler water treatment chemical of the eighth aspect, the ratio of the heterocyclic compound with N-substituted amino group or the salt thereof and the alkaline agent and/or water soluble polymer is preferably set as follows (the ratio is in weight).

(1) When the heterocyclic compound with N-substituted amino group or the salt thereof and the alkalic agent are used together, Heterocyclic compound with N-substituted amino group or Salt thereof: Alkaline agent=1:0.01–20.

(2) When heterocyclic compound with N-substituted amino group or the salt thereof and the water soluble polymer are used together, Heterocyclic compound with N-substituted amino group or Salt thereof: Water soluble polymer=1:0.01–20.

(3) When heterocyclic compound with N-substituted amino group or the salt thereof and the alkaline agent and the water soluble polymer are used together, Heterocyclic compound with N-substituted amino group or Salt thereof: Alkaline agent: Water soluble polymer= 1:0.01–20:0.01–20.

Moreover when the neutral amine is used therewith, the preferable ratio is Heterocyclic compound with N-substituted amino group or Salt thereof: Neutral amine= 1:0.01–20 (ratio in weight).

Though the essential components of the boiler water treatment chemical of the eighth aspect are the heterocyclic compound with N-substituted amino group or the salt thereof and the alkaline agent and/or the water soluble polymer and the neutral amine if necessary, another known oxygen scavenger or corrosion inhibitor such as hydrazine, sodium sulfite, saccharide, succinic acid, gluconic acid or amines other than the aforementioned neutral amine, or furthermore the known dispersant, chelate compound, descaling chemicals, or the mixture of some among these may also be added.

The boiler water treatment chemical of the eighth aspect can be effectively used in boiler systems of various types such as low pressure, medium pressure, and high pressure boiler systems and is not restricted at all by the boiler pressure, the boiler type, or the type of feed water.

Hereinafter, the eighth aspect will be described in more detail with some examples and comparative examples.

EXAMPLES 45 THROUGH 49, COMPARATIVE EXAMPLE 21

Five kinds of testing liquids were prepared by adding sodium hydroxide as the alkaline agent into 1 lit. of deionized water in such a manner that respective pHs become 8.0, 9.0, 10.0, 11.0, and 12.0. These were agitated one hours in a constant-temperature water bath at 60° C. and saturated by oxygen in air. The respective concentrations of dissolved oxygen were measured by a dissolved oxygen meter ("MOCA3600" manufactured by Obisfair). After adding 100 mg of 1-aminopyrrolidine (1-AP) as the heterocyclic compound with N-substituted amino group and sufficiently agitating them, the resultant solutions were poured into furan bottles of 200 ml capacity and the furan bottles were capped without space therein and then returned into the constant-temperature water bath at 60° C. to cause the reaction of the solution. After 20 minutes, the furan bottles were taken out from the constant-temperature water bath and the concentrations of dissolved oxygen in the solution were measured by the dissolved oxygen meter. The residual rate of dissolved oxygen in each testing liquid was calculated from the ratio of the concentration of dissolved oxygen after adding the 1-aminopyrrolidine to that before adding the agent (Examples 45 through 49). These operations were rapidly performed in nitrogen-atmosphere.

For comparison, the test was made for a testing liquid with 6.8 pH without adding sodium hydroxide in the same manner (Comparative Example 21).

Figure 2:
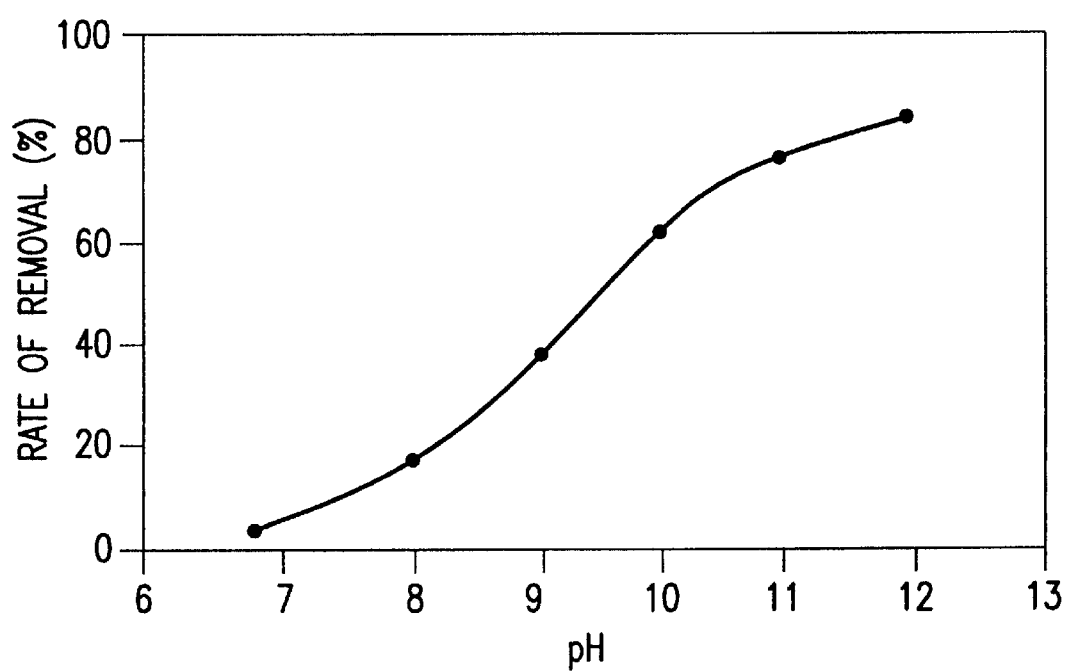
FIG. 2 is a graph showing results of examples 45 through 49 and a comparative example 21.

The results of this test are shown in Table 9 and FIG. 2.

As apparent from the results, it is found that using 1-aminopyrrolidine as the heterocyclic compound with N-substituted amino group and the alkaline agent significantly improves the deoxidization effect.

TABLE 9

| Example | pH of test water | Concentration of dissolved oxygen before adding 1-AP (mg/L) | Concentration of dissolved oxygen after adding 1-AP (mg/L) | Removal rate of dissolved oxygen (%) |
| --- | --- | --- | --- | --- |
| Example 45 | 8.0 | 4.30 | 3.55 | 17.4 |
| Example 46 | 9.0 | 4.30 | 2.65 | 38.4 |
| Example 47 | 10.0 | 4.30 | 1.60 | 62.8 |
| Example 48 | 11.0 | 4.30 | 1.00 | 76.7 |
| Example 49 | 12.0 | 4.30 | 0.70 | 83.7 |
| Comparative Example 21 | 6.8 | 4.30 | 4.05 | 5.8 |

EXAMPLES 50 THROUGH 55, COMPARATIVE EXAMPLES 22, 23

After adding 30 mg of 1- aminopyrrolidine as the heterocyclic compound with N-substituted amino group into softened water of Atsugi-city's tap water which has been saturated by oxygen in air at 40° C., the resultant water were fed into an experimental electric boiler with a capacity of 5 liters and the boiler was operated to generate steam under the following conditions. The operating time was 240 hours. Conditions:

Temperature: 183° C.,

Pressure: 1 MPa,

Amount of Evaporation: 11 liters/hr,

Blow Rate: 10%, and

Concentration of iron in feed water: 0.5 mg/L.

Previously disposed in the feed water line, the drum of the electric boiler, and the steam drain line were test pieces made of steel (SS400 of Japanese Industrial Standard) each having a length of 50 mm, a width of 15 mm, and a thickness of 1 mm The degrees of corrosion of test pieces were measured to calculate the corrosion ratios. The results are shown in Table 10. The amount of iron contained in iron oxide built up (the amount of deposited iron) on the piece disposed in the boiler drum was measured and the result was shown in Table 10 (Comparative Example 22).

The chemical components shown in Table 10 were dissolved in softened water mentioned above in such a manner as to have the respective indicated concentrations in the softened water shown in Table 10 and then fed to the boiler by using a fixed displacement pump.

As for condensate of steam generated from the softened water in which the chemical components are dissolved, the corrosion test was made under the same conditions as mentioned above to calculate the corrosion rate of test pieces and the amount of deposited iron and the results were shown in Table 10 (Examples 50 through 55, Comparative Example 23).

As apparent from Table 10, it is found that improved corrosion inhibition effect and descaling effect can be obtained by using 1-aminopyrrolidine and the alkaline agent and or the water soluble polymer, and further using the neutral amine.

TABLE 10

| Example | Chemicals and its adding rate (mg/L) | | | | Corrosion rate (mdd) | | | Iron scale formed on inner surface of boiler drum (mg/cm$^2$) |
|---|---|---|---|---|---|---|---|---|
| | 1-AP | NaOH | Water slouble polymer | AMP | Feed line | In boiler dram | Steam dram line | |
| Example 50 | 30 | 5 | 0 | 0 | 20.5 | 4.1 | 11.3 | 0.181 |
| Example 51 | 30 | 0 | 5 | 0 | 36.8 | 4.7 | 12.7 | 0.118 |
| Example 52 | 30 | 5 | 5 | 0 | 18.8 | 2.8 | 13.1 | 0.104 |
| Example 53 | 30 | 5 | 0 | 15 | 17.6 | 3.9 | 4.9 | 0.173 |
| Example 54 | 30 | 0 | 5 | 15 | 36.9 | 4.2 | 5.8 | 0.107 |
| Example 55 | 30 | 5 | 5 | 15 | 18.2 | 2.6 | 5.3 | 0.097 |
| Comparative Example 22 | 0 | 0 | 0 | 0 | 81.5 | 20.3 | 63.2 | 0.302 |
| Comparative Example 23 | 30 | 0 | 0 | 0 | 37.2 | 7.3 | 12.2 | 0.221 |

※1-AP: 1-aminopyrrolidine
water slouble polymer: copolymer of acrylic acid and hydroxyallyloxypropanepropanesulfonic acid
AMP: 2-amino-2-methyl-1-propanol As apparent from the above description, any one of the oxygen scavengers of the first through fifth aspects of the present invention can efficiently remove dissolved oxygen in water. When these are used as an oxygen scavenger for feed water of a boiler, any one of these can inhibit the corrosion on a boiler main body and a steam and condensate piping caused by dissolved oxygen. Therefore, each oxygen scavenger has quite high industrial utility.

Further, the fifth aspect provides an oxygen scavenger which prevents the development of by-products in the boiler so as not to affect the purity of steam.

The sixth aspect provides an oxygen scavenger having improved deoxidization effect in feed water lines for low temperature water and which is remarkably superior in corrosion inhibition in a feed water piping as compared with a conventional one.

The chemical for treating boiler water of the seventh aspect exhibits excellent corrosion inhibition effect relative to any of a boiler main body and steam and condensate lines although the chemical is one-component agent. This is because the heterocyclic compounds with N-substituted amino group and the neutral amine are contained in the chemical.

The eighth aspect provides a boiler water treatment chemical having both the excellent corrosion inhibition effect and the descaling effect although the chemical is one-component agent.

What is claimed is:

1. A method of using an oxygen scavenger, comprising: adding to boiler water an effective amount of an oxygen scavenger consisting of, as an effective component, a heterocyclic compound with N in a ring thereof, wherein the N is substituted by amino group or water soluble salt thereof.

2. A method of using an oxygen scavenger, according to claim 1, wherein the compound is selected from a group consisting of 1-aminopyrrolidine and 1-amino-4-methylpiperazine,

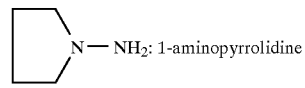

-continued

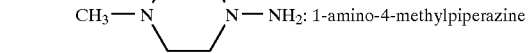

3. A method of using an oxygen scavenger according to claim 1, wherein the water soluble salt of the heterocyclic compound is a salt of the heterocyclic compound and aliphatic carboxylic acid selected from a group consisting of succinic acid, gluconic acid, glutaric acid, adipic acid, glycollic acid, lactic acid, malic acid, tartaric acid and citric acid, or polyacrylic acid.

4. A method of using an oxygen scavenger according to claim 1, wherein said heterocyclic compound with N in a ring thereof has an N—N bond.

5. A method of removing oxygen from water, comprising: adding to water an effective amount of an oxygen scavenger consisting of, as an effective component, a heterocyclic compound with N in a ring thereof, wherein the N is substituted by amino group or water soluble salt thereof.

6. A method of removing oxygen from water according to claim 5, wherein the compound is selected from a group consisting of 1-aminopyrrolidine and 1-amino-4-methylpiperazine,

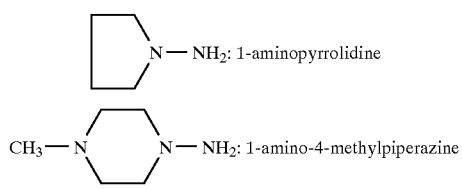

7. A method of removing oxygen from water according to claim 5, wherein the water soluble salt of the heterocyclic compound is a salt of the heterocyclic compound and aliphatic carboxylic acid selected from a group consisting of succinic acid, gluconic acid, glutaric acid, adipic acid, glycollic acid, lactic acid, malic acid, tartaric acid and citric acid, or polyacrylic acid.

8. A method of removing oxygen from water according to claim 5, wherein said heterocyclic compound with N in a ring thereof has an N—N bond.

* * * * *